US011403550B2

(12) United States Patent
Forman et al.

(10) Patent No.: US 11,403,550 B2
(45) Date of Patent: Aug. 2, 2022

(54) CLASSIFIER (71) Applicant: ENTIT Software LLC, Sunnyvale, CA (US)

(72) Inventors: George Forman, Port Orchard, WA (US); Hila Nachlieli, Haifa (IL)

(73) Assignee: MICRO FOCUS LLC, Santa Clara, CA (US)

( * ) Notice: Subject to any disclaimer, the term of this patent is extended or adjusted under 35 U.S.C. 154(b) by 1172 days.

(21) Appl. No.: 15/756,902

(22) PCT Filed: Sep. 4, 2015

(86) PCT No.: PCT/US2015/048502
§ 371 (c)(1),
(2) Date: Mar. 1, 2018

(87) PCT Pub. No.: WO2017/039684
PCT Pub. Date: Mar. 9, 2017

(65) Prior Publication Data
US 2018/0247226 A1    Aug. 30, 2018

(51) Int. Cl.
*G06N 20/00* (2019.01)
*G06K 9/62* (2022.01)

(52) U.S. Cl.
CPC .......... *G06N 20/00* (2019.01); *G06K 9/6256* (2013.01); *G06K 9/6262* (2013.01); *G06K 9/6267* (2013.01)

(58) Field of Classification Search
CPC .... G06N 20/00; G06K 9/6256; G06K 9/6262; G06K 9/6267
USPC ........................................................ 706/12
See application file for complete search history.

(56) References Cited

U.S. PATENT DOCUMENTS

| 8,386,401 | B2 | 2/2013 | Virkar et al. |
| 2003/0204507 | A1 | 10/2003 | Li et al. |
| 2010/0284590 | A1* | 11/2010 | Peng ................. G06T 7/12 382/128 |
| 2012/0203720 | A1 | 8/2012 | Baker |
| 2014/0096242 | A1* | 4/2014 | Dong ................. H04L 63/14 726/22 |
| 2014/0114583 | A1 | 4/2014 | McNair |
| 2014/0156567 | A1 | 6/2014 | Scholtes |

(Continued)

FOREIGN PATENT DOCUMENTS

| CN | 102289685 | 12/2011 |
| WO | WO-2009090584 | 7/2009 |

OTHER PUBLICATIONS

"PCT International Search Report" issued in PCT/US2015/048502; dated May 31, 2016; 4 pages.

(Continued)

*Primary Examiner* — Allen C Wong (57) ABSTRACT

An example method is provided in according with one implementation of the present disclosure. The method comprises receiving a training dataset of cases, where each of a plurality of classes is associated with a set of labeled cases in the training dataset. The method also comprises defining a proper subset of classes in the training dataset, and training a first classifier model on the proper subset of classes in the training dataset. The method further comprises testing the first classifier model on at least one class in the training dataset that was excluded from the proper subset, and determining a performance measurement of the first classifier model.

20 Claims, 6 Drawing Sheets (56) References Cited

U.S. PATENT DOCUMENTS

| | | | |
|---|---|---|---|
| 2014/0205139 A1* | 7/2014 | Kriel | G06V 20/58 |
| | | | 382/103 |
| 2015/0154507 A1 | 6/2015 | Liu et al. | |
| 2015/0178639 A1 | 6/2015 | Martin et al. | |
| 2015/0220853 A1* | 8/2015 | Marcheret | G06N 7/00 |
| | | | 706/12 |
| 2016/0132786 A1* | 5/2016 | Balan | G06N 20/00 |
| | | | 706/12 |

OTHER PUBLICATIONS

Hempstalk, K. et al.; "Discriminating Against New Classes: One-class Versus Multi-class Classification", Aug. 29, 2008; 12 pages.

Munoz-Mari, J. et al.; "A Support Vector Domain Description Approach to Supervised Classification of Remote Sensing Images"; Jan. 12, 2007; 10 pages.

* cited by examiner

CLASSIFIER

BACKGROUND

Classification of data is typically the task of assigning instances or cases to pre-defined classes (e.g., deciding whether a particular patient record can be associated with a specific disease). In other words, classification is the process of classifying something according to shared qualities or characteristics and identifying to which of a set of categories or classes a new case/instance belongs, on the basis of a training set of data. Data classification has been widely used in many organizations in recent years.

DETAILED DESCRIPTION OF SPECIFIC EXAMPLES

As mentioned above, classification of data has become increasingly popular in recent years. Many organizations use various classification methods and techniques to help them analyze and classify different types of data (e.g., customer surveys, customer support logs, engineer repair notes, system logs, etc.). One of their main goals is to assign a plurality of data cases to pre-defined classes. As used herein, the term "case" refers to a single row of data in a dataset or a single record that is to be classified (e.g., document, email, word, numerical value, etc.). As used herein, the terms "class" and "category" are to be used interchangeably and refer to various classification labels used to classify a set of cases in a way that cases in the same class are more similar to each other than to those in other class.

In some business settings, organizations may need automated classifiers to both: (1) recognize categories they know about, and (2) "balk" at (i.e., abstain from classifying) cases that do not belong to the known categories that the classifier may have training data for. In other words, it may be beneficial that classifiers have the ability to identify data that is anomalous with respect to a target class, in the sense of belonging to a new, previously unseen class. As used herein, the term "balking" refers to the refusal of an automated classifier to classify cases into some known classes. For example, in IT products problem management, there may be multi-class classifiers to recognize different types of product issues or cases (e.g., broken screen, virus issue, etc.), but there may be other cases/issues that were not (yet) defined by the classifier, for which the classifier should answer "none of the above."

In many situations, a classifier may be trained by using a learning model and applying learning algorithms on a training dataset (i.e., a subset of the main dataset that may include examples of specific classes). Thus, given a set of training examples/cases, each marked for belonging to a specific class, a training algorithm may build a classifier model that may assign new examples/cases into one category or the other, making the model a non-probabilistic classifier. As used herein, "a classifier model" refers both to the training model built by a training algorithm based on a training dataset and to the actual trained classifier that is generated based on the training model. In other examples, once a classifier model is trained, it may be called a "trained classifier" or a "classifier."

In some situations, a cross-validation may be used to train and generate a classifier model. For example, a K-fold cross-validation is a model validation technique for assessing how the results of a statistical analysis will generate an independent dataset. In some implementations, the K-fold cross-validation technique may portion the training examples of each class in the training dataset into K (a random number) of "folds" or subsamples. From the K subsamples, a single fold may be retained as the validation data for testing the model, and the remaining K−1 folds may be used as training data. The cross-validation process is then repeated K times (i.e., the number of folds), with each of the K subsamples used exactly once as the validation data. The K results from the folds can then be averaged (or otherwise combined) to produce a single estimation. Therefore. K-fold cross-validation uses all the classes and cases in the training dataset as a test set. Although this may be a good technique for classification of cases, it does not necessarily work well for balking cases.

Therefore, K-fold cross-validation and other existing techniques may not be sufficient to create a classifier that recognizes cases of known classes and balks at cases that do not belong to the known classes. Further, users would always desire to tune the classifier's parameters in some way. However, tuning the amount of balking in a classifier may be difficult. Traditional bootstrap or cross-validation classifiers are not sufficient to accomplish this task as they are only suited for situations where all the categories are known. Thus, it is desirable to have a balking classifier (e.g., a multi-class classifier) that may be tuned to do the "right" amount of balking based on the incoming data.

In this regard, according to examples, techniques for training and optimizing a classifier model, where the training dataset does not cover all classes of a corresponding target dataset are disclosure herein. In one example, the proposed techniques train an effective model that is able to classify items into the known categories as well as decide when to balk, marking some cases as "none-of-the-above." For instance, this is a common situation in building classifiers for customer support, where an organization only has training cases for some of the existing problems, and there are many other types of problems in the target dataset that needs to be classified. As used herein, the term "target dataset" refers to a large collection of data from which a training dataset is generated in order to train a balking classifier.

Therefore, while traditional classification is aimed towards classification problems, the proposed techniques concentrates on both effective classification and balking. In other words, in regular classification, the goal is to have maximal agreement between the predicted and the true class assignment of each case. Thus, both testing and training sets contain cases from each class. The techniques described herein describe situations where some of the classes are not known. The goal is to identify cases that do not belong to one of the known classes, rather than to assign all of the cases to one of the known classes. Therefore, the training data contains cases from some, but not all of the classes, hence the proposed techniques cannot, and are not intended to, assign cases to the unknown classes.

In one example, a processor may receive a training dataset of cases, wherein each of a plurality of classes is associated with a set of labeled cases in the training dataset. The processor may define a proper subset of classes in the training dataset and may train a first classifier model on the proper subset of classes in the training dataset. Finally, the processor may test the first classifier model on at least one class in the training dataset that was excluded from the proper subset, and may determine a performance measurement of the first classifier model.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Figure 1:
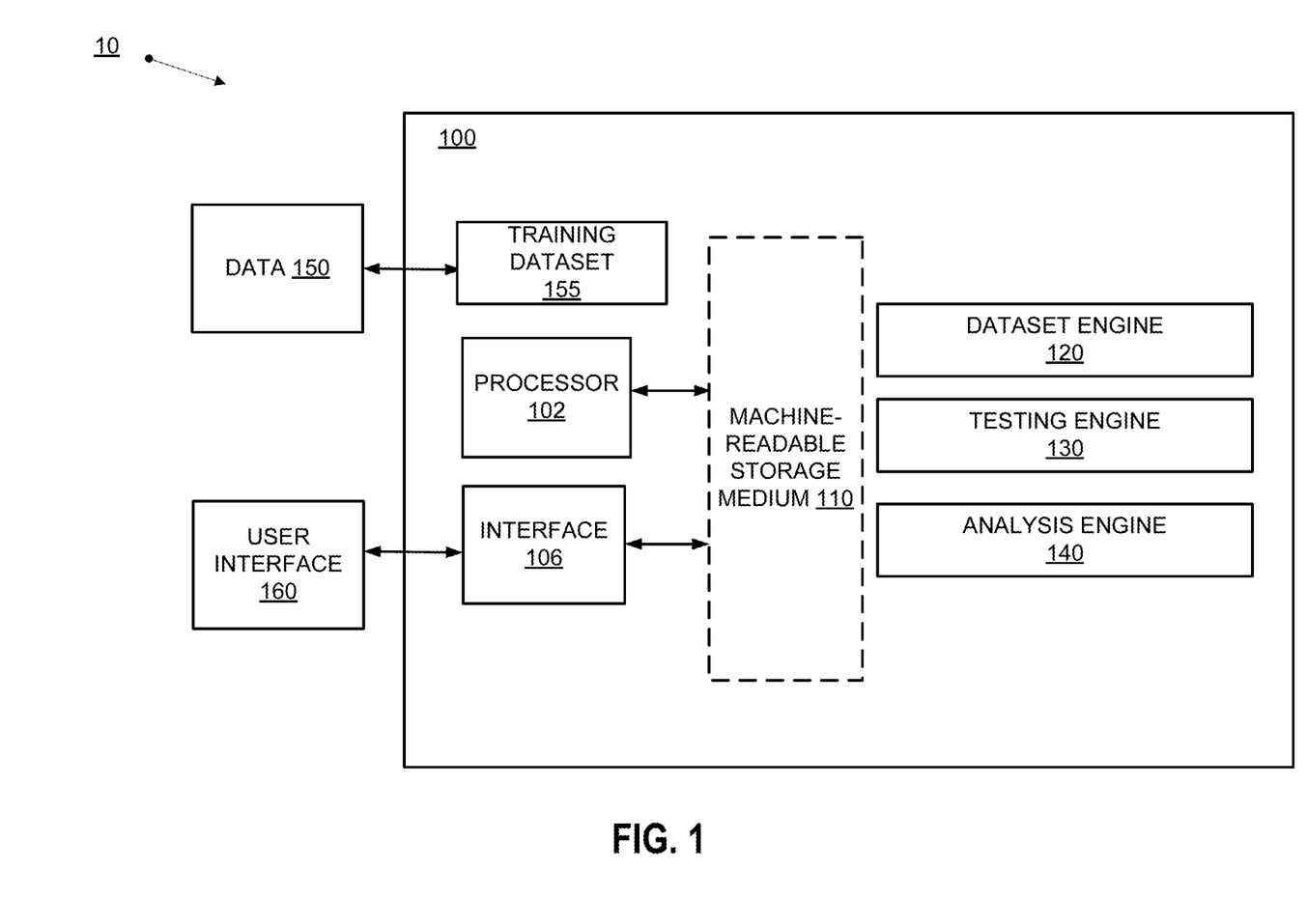
FIG. 1 is a schematic illustration of an example schematic illustration of an example system for training and optimizing a balking classifier model with a training dataset that does not train on all classes of a corresponding target dataset in accordance with an implementation of the present disclosure.

Referring now to the figures, FIG. 1 is a schematic illustration of an example system 10 for training and optimizing a balking classifier model with a training dataset that does not train on all classes of a corresponding target dataset. The illustrated system 10 is capable of carrying out the techniques described below. As shown in FIG. 1, the system 10 is depicted as including at least one a computing device 100. In the embodiment of FIG. 1, computing device 100 includes a processor 102, an interface 106, and a machine-readable storage medium 110. Although only computing device 100 is described in details below, the techniques described herein may be performed with several computing devices or by engines distributed on different devices.

In one example, the computing device 100 (or another computing device) may receive target data 150 (e.g., in the form of a dataset) that is to be classified and may communicate with at least one interactive user interface 160 (e.g., graphical user interface, etc.). A training dataset 155 may be generated from the data 155 and may be used to train and test a classifier model as described in additional details below. The data 150 may include categorical data, numerical data, structured data, unstructured data, or any other type of data.

In one example, the data in the dataset 150 may be in structured form. For example, the data may be represented as a linked database, a tabular array, an excel worksheet, a graph, a tree, and so forth. In some examples, the data in the dataset 150 may be unstructured. For example, the data may be a collection of log messages, snippets from text messages, messages from social networking platforms, and so forth. In some examples, the data may be in semi-structured form.

In another example, the data in the dataset 150 may be represented as an array. For example, columns may represent features of the data, whereas rows may represent data elements. For example, rows may represent a traffic incident, whereas columns may represent features associated with each traffic incident, including weather conditions, road conditions, time of day, date, a number of casualties, types of injuries, victims' ages, and so forth.

The computing device 100 may be any type of a computing device and may include at least engines 120-140. In one implementation, the computing device 100 may be an independent computing device. Engines 120-140 may or may not be part of the machine-readable storage medium 110. In another alternative example, engines 120-140 may be distributed between the computing device 100 and other computing devices. The computing device 100 may include additional components and some of the components depicted therein may be removed and/or modified without departing from a scope of the system that allows for carrying out the functionality described herein. It is to be understood that the operations described as being performed by the engines 120-140 of the computing device 100 that are related to this description may, in some implementations, be performed by external engines (not shown) or distributed between the engines of the computing device 100 and other electronic/computing devices.

Processor 102 may be central processing unit(s) (CPUs), microprocessor(s), and/or other hardware device(s) suitable for retrieval and execution of instructions (not shown) stored in machine-readable storage medium 110. Processor 102 may fetch, decode, and execute instructions to identify different groups in a dataset. As an alternative or in addition to retrieving and executing instructions, processor 102 may include electronic circuits comprising a number of electronic components for performing the functionality of instructions.

Interface 106 may include a number of electronic components for communicating with various devices. For example, interface 106 may be an Ethernet interface, a Universal Serial Bus (USB) interface, an IEEE 1394 (Firewire) interface, an external Serial Advanced Technology Attachment (eSATA) interface, or any other physical connection interface suitable for communication with the computing device. Alternatively, interface 106 may be a wireless interface, such as a wireless local area network (WLAN) interface or a near-field communication (NFC) interface that is used to connect with other devices/systems and/or to a network. The user interface 160 and the computing device 100 may be connected via a network. In one example, the network may be a mesh sensor network (not shown). The network may include any suitable type or configuration of network to allow for communication between the computing device 100, the user interface 160, and any other devices/systems (e.g., other computing devices, displays, etc.), for example, to send and receive data to and from a corresponding interface of another device.

Each of the engines 120-140 may include, for example, at least one hardware device including electronic circuitry for implementing the functionality described below, such as control logic and/or memory. In addition or as an alternative, the engines 120-140 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code (e.g., computer executable instructions), hardware, firmware, and/or logic, or combination thereof to perform particular actions, tasks, and functions described in more detail herein in reference to FIGS. 2-6.

In one example, the dataset engine 120 may receive a training dataset of cases 155 (e.g., from the data 150), where each of a plurality of classes is associated with a set of labeled cases in the training dataset. In one implementation, a user may label cases (e.g., logs, documents, etc.) from the data 150 to be included in the training dataset 155. In other words, the user may provide example cases for classes/categories in the data 150 that may be used to train a classifier and classify any additional cases in the data 150 or any other dataset. In addition, the dataset engine 120 may define a proper subset of classes in the training dataset. As explained in additional details below, the proper subset of classes may include any number of classes that is less than all classes in the training dataset. Various techniques may be used to define a subset of classes in the training dataset.

The testing engine 130 may train at least a first classifier model and a second classifier model on the proper subset of classes in the training dataset. In other words, the testing engine may train several classifier models that are later to be tested on the training dataset. In addition, testing the engine 130 may test the first classifier model and the second classifier model on at least one class in the training dataset that was excluded from the proper subset. Thus, at least one or multiple classifier models may be tested on multiple classes in the training dataset. However, at minimum, the classifier models have to run some of the excluded class cases during testing. In other implementations, the engine 130 may train and test a single classifier model. It is to be understood that the classifier model may include any type of classifier technology (e.g., Naive Bayes, Support Vector Machines, Neural Networks, etc.) and may also include fixed parameters (Naive Bayes with Laplace smoothing greater than 0.5; Support Vector Machines with a cost parameter greater than 1000; Neural Networks with a neuron depth greater than three, etc.).

In order to perform training and testing of the classifier models, the testing engine 130 may partition the labeled cases within each class into a plurality of partitions and may partition the classes in the training dataset into a plurality of groups. Further, for each classifier model, the testing engine 130 may: select a partition of cases as a test partition; select a group of classes to be excluded from the proper subset of classes, wherein the excluded group represents classes that are to be unfamiliar to the classifier model; train a classifier model on labeled cases of the training dataset that are not in the selected group and the selected test partition; test the classifier model on the test cases of the test partition, where classes in the excluded group of classes are considered the cases that should be considered unfamiliar of the classifier model; and determine a performance measurement of the classifier model.

The analysis engine 140 may determine a performance measurement of the first classifier model and the second classifier model. As described in additional details below, various techniques may be used to determine the performance measurement of the classifier models. In addition, the analysis engine 140 may compare the performance measurement of the first classifier model and the second classifier model and may select a best performing classifier model based on the comparison. Further, for each classifier model, the analysis engine 140 may: determine a performance measurement of the classifier model for a plurality of folds; aggregate the performance measurement of the classifier model from the plurality of folds; and output the aggregated performance measurement of the classifier model.

Figure 2:
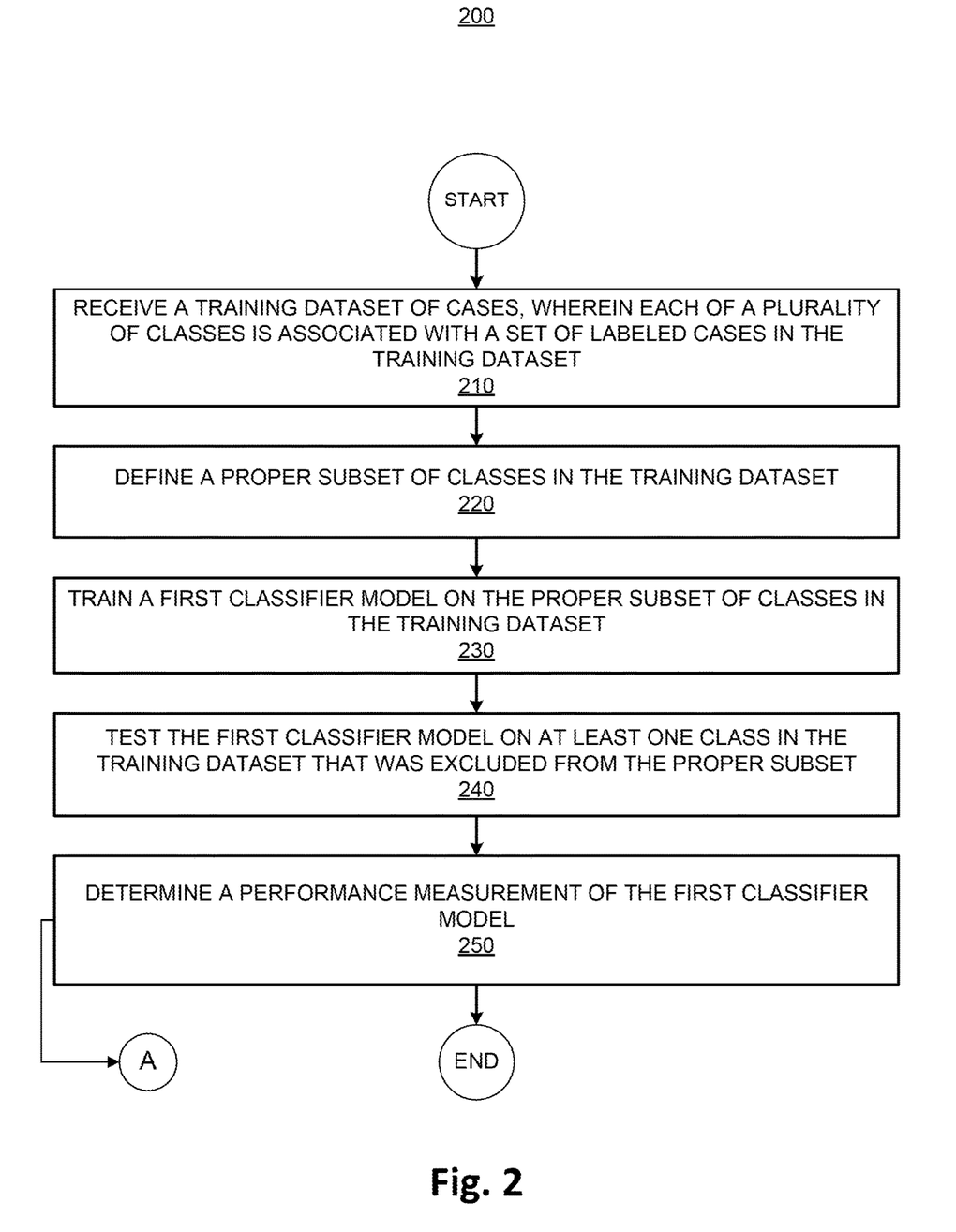
FIG. 2 illustrates a flowchart showing an example of a method for training and optimizing a balking classifier model with a training dataset that does not train on all classes of a corresponding target dataset in accordance with an implementation of the present disclosure.

FIG. 2 illustrates a flowchart showing an example of a method 200 for training and optimizing a balking classifier model with a training dataset that does not train on all classes of a corresponding target dataset. Although execution of the method 200 is described below with reference to the system 10, the components for executing the method 200 may be spread among multiple devices/systems. The method 200 may be implemented in the form of executable instructions stored on a machine-readable storage medium, and/or in the form of electronic circuitry.

In one example, the method 200 can be executed by at least one processor of a computing device (e.g., processor 102 of device 100). In other examples, the method may be executed by another processor in communication with the system 10. Various elements or blocks described herein with respect to the method 200 are capable of being executed simultaneously, in parallel, or in an order that differs from the illustrated serial manner of execution. The method 200 is also capable of being executed using additional or fewer elements than are shown in the illustrated examples.

The method 200 begins at 210, where a processor may receive a training dataset of cases (e.g., 155). For instance, the training dataset may be obtained from a target dataset 150 (e.g., data regarding customer support logs—keyboard issue logs, email issue logs, etc.). In one example, that training dataset includes a plurality of classes, where each of the plurality of classes is associated with a set of labeled cases. For example, various cases (e.g., support log issues) in the training dataset may be labeled (e.g., by user, by a machine, etc.) as specific examples of classes or categories of the data 150 (e.g., keyboard issues class, email issues class, etc.). In some implementations, that training dataset may include at least three classes. In other implementations, the training dataset may include any other number of classes.

At 220, the processor may define a proper subset of classes in the training dataset. In some examples, the proper subset of classes may include any number of classes that is less than all classes in the training dataset. In one implementation, defining the proper subset of classes is performed with random selection of classes. For example, the processor may randomly partition the classes in the training dataset into a plurality of groups. In other examples, partitioning of the classes may not be done randomly, but the classes may be purposely split into various groups. Further, the processor may partition the labeled cases within each class into a plurality of partitions. That way, the training dataset may be divided into groups of classes and partitions of labeled cases.

Next, the processor may train a first classifier model on the proper subset of classes in the training dataset (at 230). As explained in additional details below, more than one classifier model may be trained on the proper subset of classes in the training dataset. Then, the processor may test the first classifier model on at least one class in the training dataset that was excluded from the proper subset (at 240). In other words, the processor may test the first classifier model on more classes that the classifier model was trained on. Before performing training and testing of the classifier model, the processor may partition the labeled cases within each class into a plurality of partitions and may partition the classes in the training dataset into a plurality of groups.

At 250, the processor may determine a performance measurement of the first classifier model. In one example, the performance measurement for a classifier model determines how accurately the classifier model balks cases that don't belong to known classes in a dataset while still efficiently classifies cases in a dataset into different classes. Various techniques may be used to determine the performance measurement of the classifier model. In some examples, the performance measurement may be calculated by using: percent correct/accuracy, an "F-measure," or by using any other reasonable methods. Additional details regarding training, testing, and determine a performance measurement of the first classifier model are described below in relation to FIGS. 3-4.

In some examples, the processor may train and test at least a plurality of classifier models. Thus, the processor may determine a performance measurement of at least a second classifier model. It is to be understood that the second classifier model (or any additional classifier model) will be evaluated in the same way as the first classifier model (i.e., by using the techniques described in FIGS. 2-4). Further, the processor may compare the performance measurement of the first classifier model and the second classifier model, and may select a best performing classifier model based on the comparison. In some implementations, the best performing classifier model may be determined based on the accuracy of classifying cases into categories while balking cases that don't belong to known classes.

Figure 3:
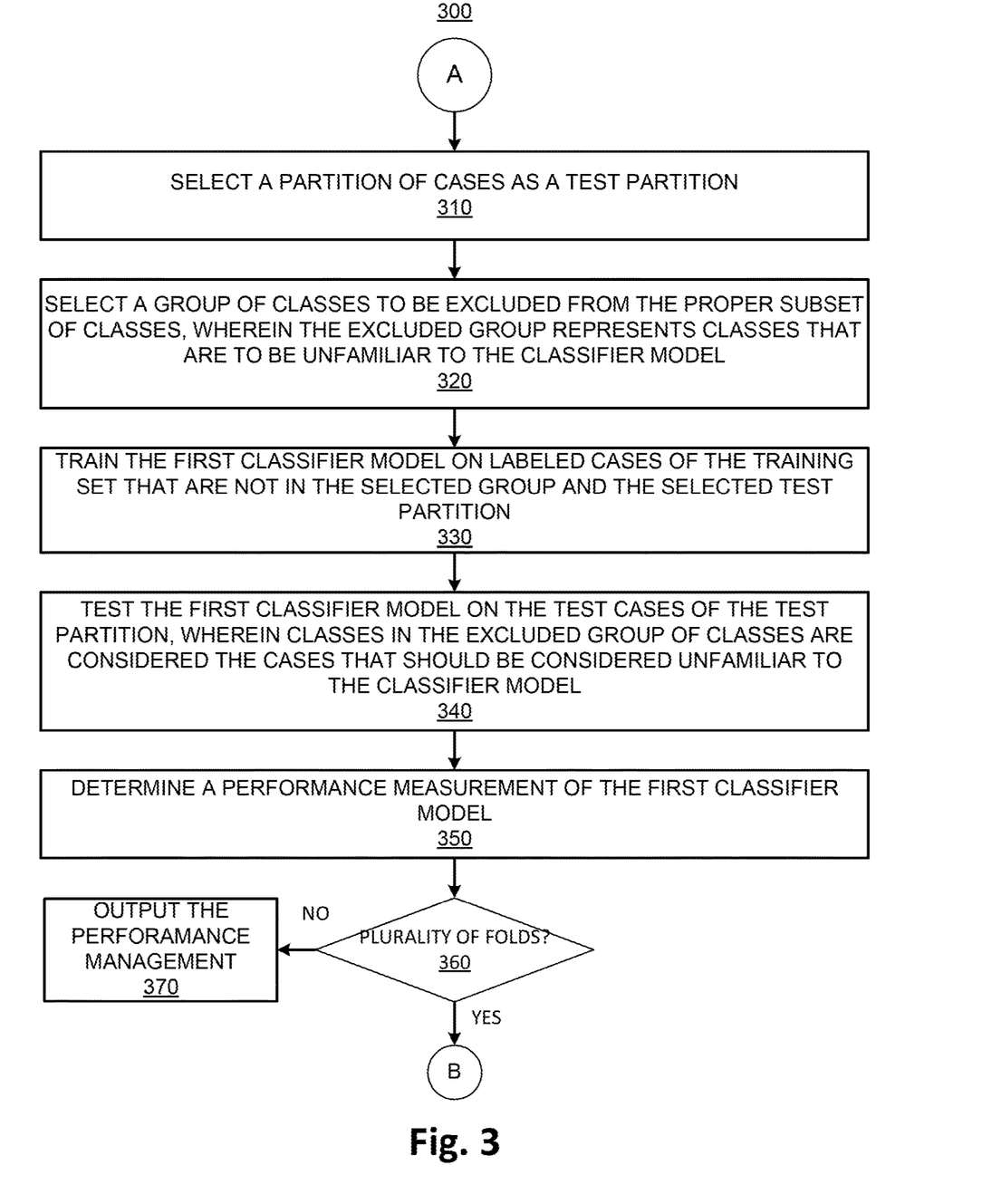
FIGS. 3 and 4 illustrate a flowchart showing an example of a method for training, testing, and determining a performance measurement of a classifier model in accordance with an implementation of the present disclosure.
Figure 4:
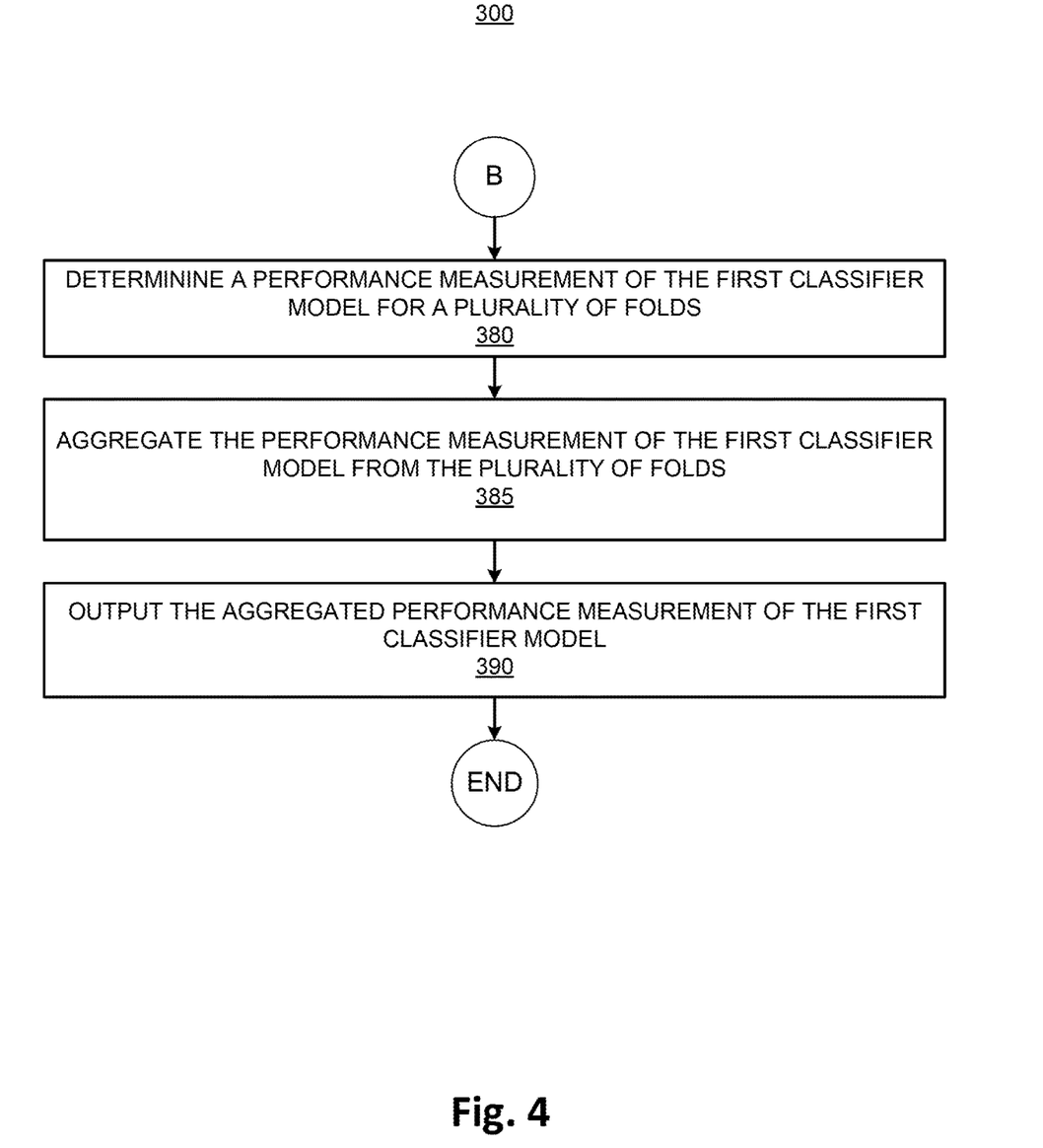
Figure 5:
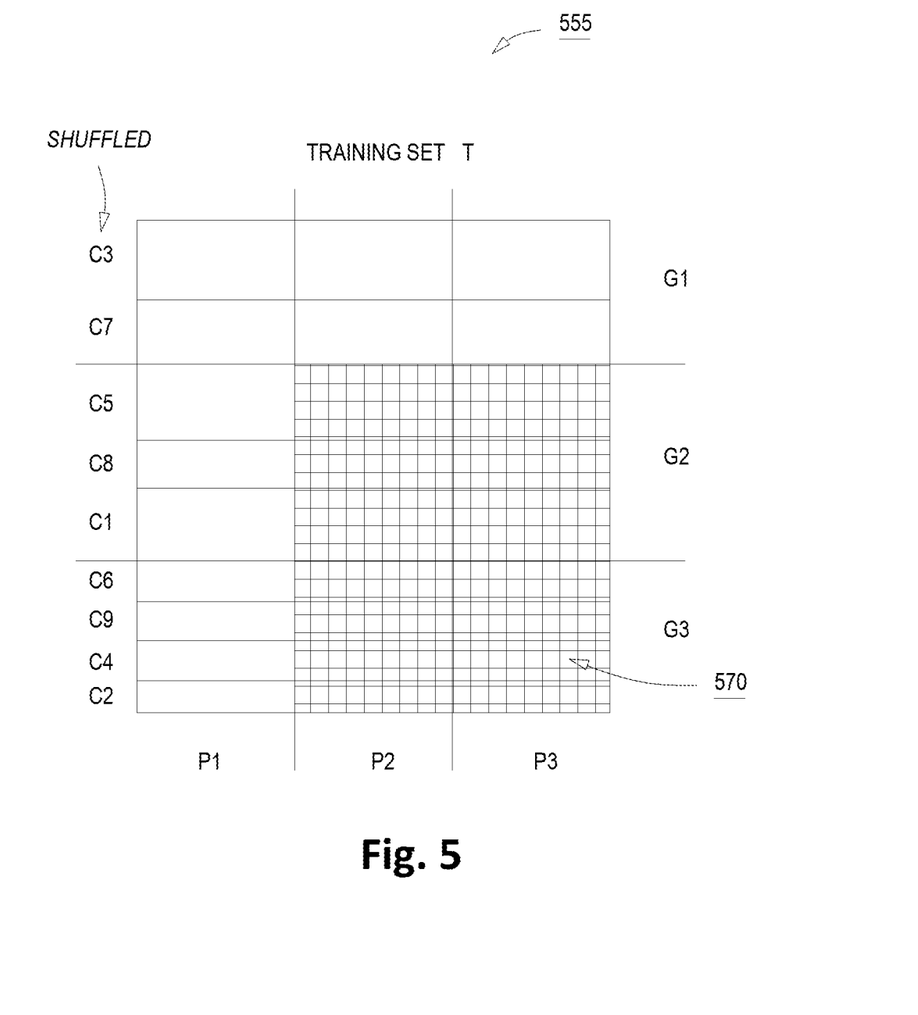
FIG. 5 is an example training dataset used to train and test a classifier model in accordance with an implementation of the present disclosure.

FIGS. 3 and 4 illustrate a flowchart showing an example of a method 300 for training, testing, and determining a performance measurement of a classifier model. The method shown in FIGS. 3-4 will be described in references to FIG. 5, which shows an example training dataset 555 used to train and test a classifier model. As noted above, prior performing the method 300, at least one processor may partition the classes in the training dataset into a plurality of groups and may partition the labeled cases within each class into a plurality of partitions. For example, as shown in FIG. 5, at least one processor may randomly partition classes C1-C8 in the training dataset 555 into three groups G1-G3. Further, the processor may randomly partition the labeled cases in the training dataset 555 into three partitions P1-P3.

Although execution of the method 300 is described below with reference to the system 10, the components for executing the method 300 may be spread among multiple devices/systems. The method 300 may be implemented in the form of executable instructions stored on a machine-readable storage medium, and/or in the form of electronic circuitry. In one example, the method 300 can be executed by at least one processor of a computing device (e.g., processor 102 of device 100).

The method 300 begins at 310, where at least one processor may select a partition of cases as a test partition. In other words, the processor may designate a partition of cases on which later will test the trained classifier model. In one example, the processor may select P1 as such test partition.

At 320, the processor may select a group of classes to be excluded from the proper subset of classes, where the excluded group represents classes that are to be unfamiliar to the classifier model. In one example, the processor may select group G1 (including classes C3 and C7) to represent the classes that will be unfamiliar to the model. Thus, these are the classes that a classifier model should balk on. These classes are not be provided to the classifier model as labeled training examples to train on, they are to be held back.

Next, the processor may train the first classifier model on labeled cases of the training dataset that are not in the selected group (e.g., G1) and the selected test partition (e.g., P1) (at 330). In FIG. 5, the portion of cases used by the processor to train the first classifier model are identified by the marked area 570. In one example, the processor may train the first classifier model on the classes in the remaining groups (G2 and G3) using only the labeled cases that are not in the test partition P1 (i.e., using cases in P2 and P3). Therefore, in some examples, the processor may train the classifier model intersecting area between groups G2/G3 and partitions P2/P3 (i.e., the cases included in the area 570). In other words, only some of the labels of the cases in the selected classes are "revealed" during training, while the labels of all of the cases in other classes and the other cases in the selected classes are hidden. That way, the classifier model is trained to balk on same of the cases (e.g., represented by classes C3 and C7 and the partition P1).

With continued reference to FIGS. 3-5, the processor may test the first classifier model on the test cases of the test partition (e.g., P1), where cases in the excluded group of classes are considered the cases that should be considered unfamiliar to the classifier model (at 340). In other words, it is important that the processor tests the first classifier model on more classes that the classifier model was trained on (i.e., test on at least one class that was excluded from training). For example, the processor may test the classifier model on all the test cases of P1, where classes in G1 are considered the cases that should be considered unfamiliar by the classifier model (i.e., the model should balk on C3, C7 cases). Thus by testing on G1 the processor may determine how the classifier model does in balking. Because the classifier model was not trained on classes C3/C7, it should balk when cases from classes C3/C7 are found.

At 350, the processor may determine a performance measurement of the first classifier model. The techniques for determining a performance measurement of the first classifier model are describe above in relation to block 250 of method 200.

At 360, the processor may determine whether there are a plurality of test folds to be included in the test measurement. As used herein, the term "fold" may refer to a group of classes (e.g., G1-G3) or a partition of labeled cases (e.g., P1-P3) in the training dataset. In some implementations, a user may choose in advance whether to perform testing on a single random fold or all folds. In one example, when the processor determines that there is a single fold to be used for testing, the processor may output the performance measurement of the first classifier model without any additional computation (at 370). In one example, when the cases in the training dataset are partitioned to a plurality of groups, the number of test folds may correspond to that number. In another example, the number of partitions (e.g., P1-P3) may be equal to the number of groups of classes (e.g. G1-G3) and the test measurement would be repeated for each of the folds and groups together (e.g. when testing P1 the classes in group G1 would be held back when training the classifier, then when testing P2 the group G2 would be held back, then when testing P3 the group G3 would be held back).

In one implementation, the number of groups of classes (e.g., G1-G10) may be different from the number partitions of labeled cases (e.g., P1-P3) in the training dataset. In that situation, the processor may accordingly use the different number of folds to define the different training data and testing data used for the classifier model (as described above in blocks 310-350). For example, the processor may test each of the partition folds against each of the group folds (e.g. testing P1 with G1, then P1 with G2, then P1 with G3, then testing P2 with G1, P2 with G2, P2 with G3, etc.).

When the processor determines that there are plurality of folds, the processor may then determine a performance measurement of the first classifier model for the plurality of folds (at 380). In one example, the processor may repeat blocks 310-350 for each of the folds. Next, the processor may aggregate the performance measurement of the first classifier model from the plurality of folds (at 385). Various techniques may be used to aggregate the performance measurement of the first classifier model from the plurality of folds. For example, the processor may first average the performance measurement of the first classifier model from the plurality of folds before aggregating them. In another example, an F-measure technique may be used to aggregate the performance measurement of the first classifier model from the plurality of folds. At 390, the processor may output the aggregated performance measurement of the first classifier model (e.g., via the user interface 160). Based on that output, a user may make a decision which classifier model to select.

Figure 6:
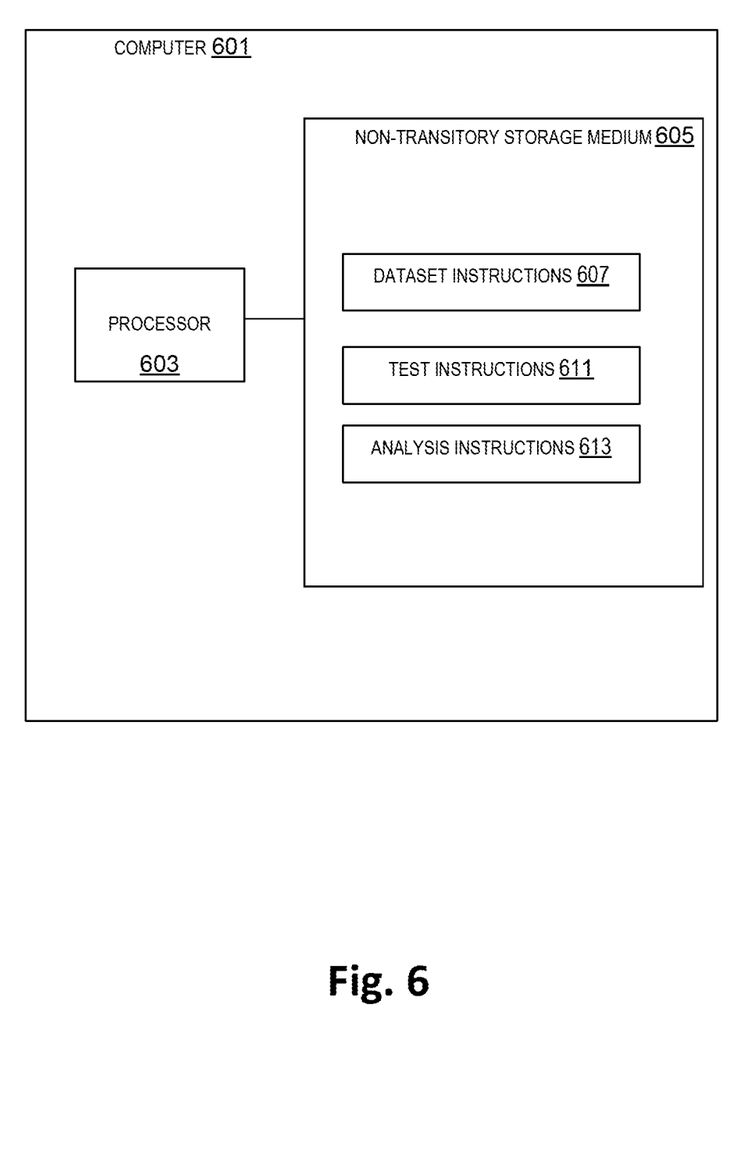
FIG. 6 is an example block diagram illustrating a computer-readable medium in accordance with an implementation of the present disclosure.

FIG. 6 illustrates a computer 601 and a non-transitory machine-readable medium 605 according to an example. In one example, the computer 601 maybe similar to the computing device 100 of the system 10 or may include a plurality of computers. For example, the computer may be a server computer, a workstation computer, a desktop computer, a laptop, a mobile device, or the like, and may be part of a distributed system. The computer may include one or more processors and one or more machine-readable storage media. In one example, the computer may include a user interface (e.g., touch interface, mouse, keyboard, gesture input device, etc.).

Computer 601 may perform methods 200-300 and variations thereof. Additionally, the functionality implemented by computer 601 may be part of a larger software platform, system, application, or the like. Computer 601 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 601 may include a processor 603 and non-transitory machine-readable storage medium 605. The processor 603 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device) and the storage medium 605 may be operatively coupled to a bus. Processor 603 can include single or multiple cores on a chip, multiple cores across multiple chips, multiple cores across multiple devices, or combinations thereof.

The storage medium 605 may include any suitable type, number, and configuration of volatile or non-volatile machine-readable storage media to store instructions and data. Examples of machine-readable storage media in include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored.

Software stored on the non-transitory machine-readable storage media 605 and executed by the processor 603 includes, for example, firmware, applications, program data, filters, rules, program modules, and other executable instructions. The processor 603 retrieves from the machine-readable storage media 605 and executes, among other things, instructions related to the control processes and methods described herein.

The processor 603 may fetch, decode, and execute instructions 607-613 among others, to implement various processing. As an alternative or in addition to retrieving and executing instructions, processor 603 may include at least one integrated circuit (IC), other control logic, other electronic circuits, or combinations thereof that include a number of electronic components for performing the functionality of instructions 607-613. Accordingly, processor 603 may be implemented across multiple processing units and instructions 607-613 may be implemented by different processing units in different areas of computer 601.

The instructions 607-613 when executed by processor 603 (e.g., via one processing element or multiple processing elements of the processor) can cause processor 603 to perform processes, for example, methods 200-300, and/or variations and portions thereof. In other examples, the execution of these and other methods may be distributed between the processor 603 and other processors in communication with the processor 603.

For example, dataset instructions 607 may cause processor 603 to receive a training dataset of cases, where each of a plurality of classes is associated with a set of labeled cases in the training dataset. Further, dataset instructions 607 may cause processor 603 to define a proper subset of classes in the training dataset by using random selection of classes. These instructions may function similarly to the techniques described in blocks 210-220 of method 200 and to the techniques described in method 300.

Test instructions 611 may cause the processor 603 to train a first classifier model on the proper subset of classes in the training dataset and to test the first classifier model on at least one class in the training dataset that was excluded from the proper subset. These instructions may function similarly to the techniques described blocks 230-240 of method 200 and blocks 330-340 of method 400.

Analysis instructions 613 may cause the processor 603 to determine a performance measurement of the first classifier model. Further, when more than one classifier model is trained, the analysis instructions 613 may cause the processor 603 to determine a performance measurement of at least a second classifier model, compare the performance measurement of the first classifier model and the second classifier model, and select a best performing model based on the comparison. These instructions may function similarly to the techniques described in block 250 of method 200 and block 350 of method 300. In addition, instructions that function similarly to the techniques described in the method 300 may cause the processor 603 to train, test, and determine the performance measurement of a classifier model with multiple folds.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by at least one processor:
receiving a training dataset of cases, wherein the cases in the training dataset are associated with a plurality of classes;
selecting a first group of the plurality of classes in the training dataset to be a proper subset of classes for training a first classifier model;
selecting a second group of the plurality of classes that are excluded from the proper subset of classes to be an excluded group of classes for testing the first classifier model;
selecting a partition of the cases in the training dataset to be a test partition for testing the first classifier model;
training the first classifier model on the proper subset of classes using the cases in the training dataset that are not in the test partition and not associated with the excluded group of classes;
testing the first classifier model on the excluded group of classes using the cases in the test partition; and
determining a performance measurement of the first classifier model.

2. The method of claim 1, further comprising, by the at least one processor:
determining a performance measurement of a second classifier model;
comparing the performance measurement of the first classifier model and the second classifier model; and
selecting a best performing classifier model based on the comparison.

3. The method of claim 1, wherein the proper subset of classes is randomly selected from the plurality of classes in the training dataset.

4. The method of claim 1, wherein the plurality of classes in the training dataset include at least three classes.

5. The method of claim 1, further comprising, by the at least one processor:
partitioning the plurality of classes in the training dataset into a plurality of groups, including the proper subset of classes and the excluded group of classes.

6. The method of claim 5, further comprising, by the at least one processor:
partitioning the cases in the training dataset into a plurality of partitions, including the test partition.

7. The method of claim 1, wherein the excluded group of classes represents classes that are unfamiliar to the first classifier model.

8. The method of claim 1, further comprising, by the at least one processor:
determining the performance measurement of the first classifier model for a plurality of test folds;
aggregating the performance measurement of the first classifier model from the plurality of test folds; and
outputting the aggregated performance measurement of the first classifier model.

9. A system comprising:
a processor; and
a memory storing instructions that when executed by the processor cause the processor to:
receive a training dataset of cases, wherein the cases in the training dataset are associated with a plurality of classes,
select a first group of the plurality of classes in the training dataset to be a proper subset of classes for training a first classifier model,
select a second group of the plurality of classes that are excluded from the proper subset of classes to be an excluded group of classes for testing the first classifier model,
select a partition of the cases in the training dataset to be a test partition for testing the first classifier model,
train the first classifier model on the proper subset of classes using the cases in the training dataset that are not in the test partition and not associated with the excluded group of classes,
test the first classifier model on the excluded group of classes using the cases in the test partition, and
determine a performance measurement of the first classifier model.

10. The system of claim 9, wherein the instructions further cause the processor to:
partition the cases in the training dataset into a plurality of partitions, including the test partition; and
partition the plurality of classes in the training dataset into a plurality of groups, including the proper subset of classes and the excluded group of classes.

11. The system of claim 9, wherein the excluded group of classes represents classes that are unfamiliar to the first classifier model.

12. The system of claim 9, wherein the instructions further cause the processor to:
determine the performance measurement of the first classifier model for a plurality of test folds;
aggregate the performance measurement of the first classifier model from the plurality of test folds; and
output the aggregated performance measurement of the first classifier model.

13. The system of claim 9, wherein the instructions further cause the processor to:
determine a performance measurement of a second classifier model;
compare the performance measurement of the first classifier model and the second classifier model; and
select a best performing classifier model based on the comparison.

14. A non-transitory machine-readable storage medium storing instructions that when executed by at least one processor cause the at least one processor to:
receive a training dataset of cases, wherein the cases in the training dataset are associated with a plurality of classes;
select a first group of the plurality of classes in the training dataset to be a proper subset of classes for training a first classifier model;
select a second group of the plurality of classes that are excluded from the proper subset of classes to be an excluded group of classes for testing the first classifier model;
select a partition of the cases in the training dataset to be a test partition for testing the first classifier model;
train the first classifier model on the proper subset of classes using the cases in the training dataset that are not in the test partition and not associated with the excluded group of classes;
test the first classifier model on the excluded group of classes using the cases in the test partition; and
determine a performance measurement of the first classifier model.

15. The non-transitory machine-readable storage medium of claim 14, wherein the instructions further cause the at least one processor to:

determine a performance measurement of a second classifier model;

compare the performance measurement of the first classifier model and the second classifier model; and select a best performing classifier model based on the comparison.

16. The non-transitory machine-readable storage medium of claim 14, wherein the excluded group of classes represents classes that are unfamiliar to the first classifier model.

17. The non-transitory machine-readable storage medium of claim 14, wherein the proper subset of classes is randomly selected from the plurality of classes.

18. The non-transitory machine-readable storage medium of claim 14, wherein the test partition is randomly selected from the cases in the training dataset.

19. The non-transitory machine-readable storage medium of claim 14, wherein the instructions further cause the at least one processor to:

partition the plurality of classes in the training dataset into a plurality of groups, including the proper subset of classes and the excluded group of classes.

20. The non--transitory machine-readable storage medium of claim 14, wherein the instructions further cause the at least one processor to:

partitioning the cases in the training dataset into a plurality of partitions, including the test partition.

\* \* \* \* \*